(12) United States Patent
Minor et al.

(10) Patent No.: US 6,208,936 B1
(45) Date of Patent: Mar. 27, 2001

(54) UTILIZATION OF A MAGNETIC SENSOR TO COMPENSATE A MEMS-IMU/GPS AND DE-SPIN STRAPDOWN ON ROLLING MISSILES

(75) Inventors: Roy R. Minor, Urbana; David W. Rowe, Cedar Rapids, both of IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/335,654

(22) Filed: Jun. 18, 1999

(51) Int. Cl.[7] .................................................. G06F 165/00
(52) U.S. Cl. ........................... 701/220; 701/200; 244/171
(58) Field of Search ..................................... 701/220, 221, 701/200; 244/166, 171; 73/178 R

(56) References Cited

U.S. PATENT DOCUMENTS

| | | | | |
|---|---|---|---|---|
| 4,254,465 | * | 3/1981 | Land | 701/220 |
| 4,460,964 | * | 7/1984 | Skutecki et al. | 701/12 |
| 5,455,591 | * | 10/1995 | Hui | 342/185 |

* cited by examiner

Primary Examiner—William A. Cuchlinski, Jr.
Assistant Examiner—Gertrude Arthur
(74) Attorney, Agent, or Firm—Nathan O. Jensen; Kyle Eppele; J. P. O'Shaughnessy

(57) ABSTRACT

A magnetic sensor that measures the angle of the sensor's sensitive axis relative to a local magnetic field compensates the navigation solution of a MEMS-IMU/GPS navigation system. A stable navigation solution is thereby maintained. The magnetic sensor is mounted on a body axis of the vehicle perpendicular the spin axis of the vehicle. As the vehicle spins, the magnetic sensor provides an analog output voltage that varies sinusoidally with vehicle roll with the zero crossings occurring when the sensor's sensitive axis is perpendicular to the local magnetic field. The magnetic sensor measurements combined with knowledge of the local magnetic field relative to the local level reference are used to correct the navigation solution's roll error. Following high rate sampling of accelerometers and gyros, and algorithm to computational de-spin in the navigation solution is executed whereby navigation processing may be implemented with a non-rolled vehicle body frame algorithm.

20 Claims, 4 Drawing Sheets

UTILIZATION OF A MAGNETIC SENSOR TO COMPENSATE A MEMS-IMU/GPS AND DE-SPIN STRAPDOWN ON ROLLING MISSILES

FIELD OF THE INVENTION

The present invention generally relates to the field of navigation systems, and particularly to navigation systems for projectiles.

BACKGROUND OF THE INVENTION

The recent emergence of micro-electro-mechanical systems (MEMS) inertial sensors has made it possible to integrate a MEMS inertial measurement unit (IMU) and a global positioning system (GPS) receiver on board small missiles, rockets or the like type of projectiles or vehicles to perform strapdown navigation. Some types of missiles are imparted with a roll about a longitudinal axis in order to provide stability during flight. However, as the vehicles spins, a rapidly growing roll attitude error accumulates due to the scale factor error of the MEMS roll gyro, and the accumulated roll error eventually causes the navigation solution to become unstable. Thus, there lies a need for a method and apparatus that compensates for the accumulated roll attitude error in rolling vehicles.

Furthermore, strapdown navigation equations are linearized by small angle approximations. Therefore, the angular change in body attitude must not exceed a small amount between computation intervals, otherwise the equations become invalid. For rolling missiles, the roll angle continuously changes at a very high rate that imposes an extremely high computational rate requirement on the navigation processor. Thus, there also lies a need for a navigation system and method that allows for a reasonable computational rate requirement on the navigation processor of a rolling missile.

SUMMARY OF THE INVENTION

The invention utilizes measurements from a magnetoresistance ratio (MR) sensor to compensate the navigation solution of a MEMS-IMU/GPS navigation system to effectively keep the roll attitude error in check whereby a stable navigation solution is maintained. The MR sensor measures the angle of the sensor's sensitive axis relative to a local magnetic field (i.e. the earth's natural magnetic field). The MR sensor is mounted on a body axis of the vehicle perpendicular the spin axis of the vehicle. As the vehicle spins, the MR sensor provides an analog output voltage that varies sinusoidally with vehicle roll with the zero crossings occurring when the sensor's sensitive axis is perpendicular to the local magnetic field. The MR sensor measurements combined with a priori knowledge of the local magnetic field relative to the local level reference is used to correct the navigation solution's roll error.

The present invention further utilizes computational de-spin in the navigation solution by taking advantage of the fact that, even though a missile may have a high roll rate, the accelerations and pitch and yaw rates are not excessively high by conventional navigation processing standards. Following high rate sampling of accelerometers and gyros, a de-spin algorithm is implemented whereby processing may be implemented with a non-rolled vehicle body frame algorithm.

In one embodiment, the present invention is directed to a method for compensating the roll attitude error in the navigation solution for a rolling vehicle wherein the method includes steps for sampling navigation data for a rolling vehicle, generating an inertial attitude error estimate from the sampled navigation data, monitoring an output of a magnetic field sensor, the magnetic field sensor having a sensitive axis being disposed perpendicular to an axis of rotation of the rolling vehicle, the output of the magnetic field sensor being generated as the rolling vehicle passes through a local magnetic field, detecting a zero crossing point in the output of the magnetic field sensor, calculating a measurement residual based on the navigation data at a time corresponding to the zero crossing point, and updating the inertial attitude error estimate with the calculated measurement residual whereby the navigation solution remains stable.

In another embodiment, the present invention is directed to a method for computationally de-spinning strapdown inertial sensor measurements for navigation on a rolling vehicle. The method includes steps for sampling navigation data of a rolling vehicle wherein the sampled data includes accelerometer data, roll data, pitch data and yaw data for the rolling vehicle, integrating roll data of the sampled data over a predetermined interval, computing a roll angle change transform, updating the roll angle change transform with incremental roll change data, transforming and integrating accelerometer data with the roll angle change transform whereby the accelerometer data is de-spun, transforming and integrating pitch and yaw data with the roll angle change transform whereby the pitch and yaw data are de-spun, and computing a navigation solution strapdown at a predetermined navigation processing rate.

In a further embodiment, the invention is directed to a method for computing a navigation solution in a rolling vehicle. The method includes steps for sampling navigation data of a rolling vehicle wherein the sampled data includes accelerometer data, roll data, pitch data and yaw data for the rolling vehicle, calculating a measurement residual based upon the output of a magnetic sensor that detects the orientation of the rolling vehicle with respect to a local magnetic field, updating an inertial attitude error estimate with the calculated measurement residual whereby the navigation solution remains stable, computationally de-spinning accelerometer and pitch and yaw data, and computing a navigation solution strapdown at a predetermined navigation processing rate with the de-spun accelerometer, pitch and yaw data.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
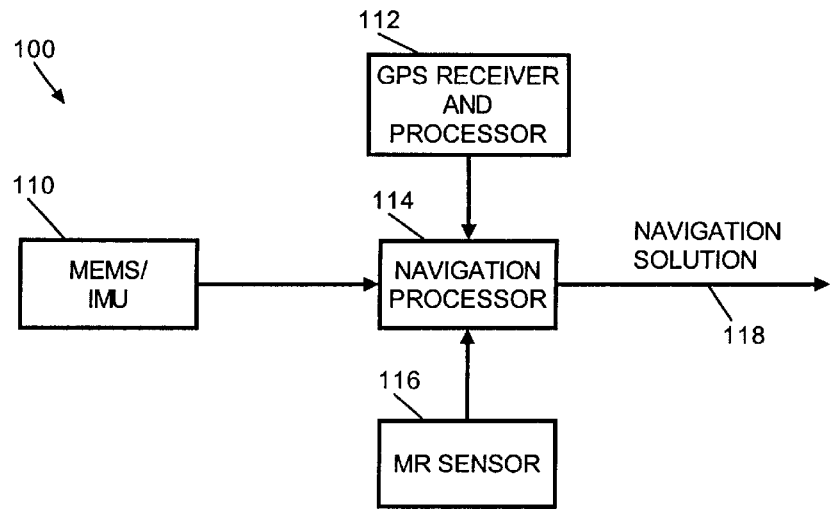
FIG. 1 is a block diagram of a navigation system for a vehicle such as a missile in accordance with the present invention.

Referring now to FIG. 1, a block diagram of a navigation system in accordance with the present invention will be discussed. The navigation system 100 includes a micro-electrical-mechanical system inertial sensor and inertial measurement unit (MEMS/IMU) 110 for providing an inertial reference signal to navigation processor 114. A global positioning system (GPS) receiver and processor 112 provides a position and time reference signal to navigation processor 114. Navigation processor 114 provides a navigation solution output 118 based upon the reference signal received from MEMS/IMU 110 and GPS receiver and processor 112. Navigation processor 114 may include all of the hardware and circuits for receiving and processing input signals, including one or more analog-to-digital (A/D) converters, a microprocessor or digital signal processor (DSP) read-only memory (ROM), random-access memory, program and data storage or memory, and associated instructions stored in a memory device for implementing a navigational system as known in the art of navigational systems. In accordance with the present invention, a magnetoresistance ratio (MR) sensor 116 provides an analog output voltage to navigation processor 114 wherein the output voltage is a function of the strength of a local magnetic field component with respect to the sensitive axis of the MR sensor 116. The analog output voltage of MR sensor 116 may be converted from an analog to a digital signal with an A/D converter for digital processing of the output signal of MR sensor 116 by navigation processor 114.

Figure 2:
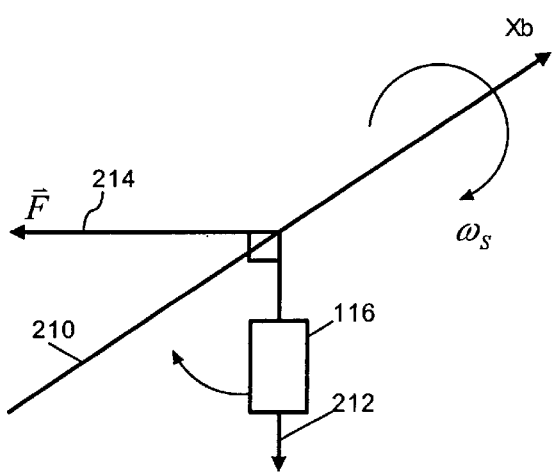
FIG. 2 is a graphical representation of the orientation of the sensitive axis of a magnetoresistance ratio sensor with respect to the vehicle roll axis and a local magnetic field vector in accordance with the present invention.
Figure 3:
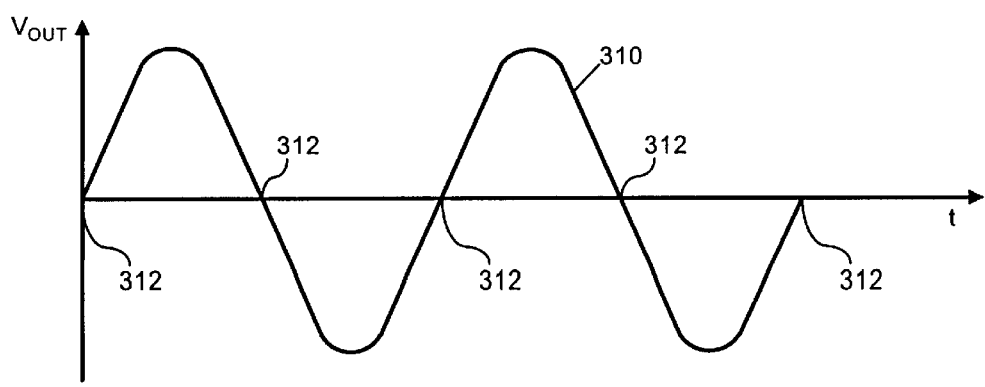
FIG. 3 is a graph of the output voltage of a magnetoresistance ratio sensor utilized on a rolling vehicle in accordance with the present invention.

As shown in FIG. 2, MR sensor 116 is installed in a vehicle of interest (e.g., missile, rocket, etc.) such that the sensitive axis 212 of MR sensor 116 is perpendicular to the axis of rotation (Xb) 210 of the vehicle. As the vehicle rotates, or rolls, about axis of rotation 210 at a rate $\omega_s$, the direction of sensitive axis 212 of MR sensor periodically changes with respect to a local magnetic field, $\vec{F}$, 214. When sensitive axis 212 of MR sensor 116 is maximally aligned with magnetic field 214, the analog output voltage of MR sensor 116 will have a maximum value. When sensitive axis 212 of MR sensor 116 is maximally aligned against magnetic field 214, the analog output voltage of MR sensor 116 will have a minimum value. When sensitive axis 212 of MR sensor 116 is perpendicular to magnetic field 214, the analog output voltage of MR sensor will be zero valued. Thus, as the roll rate $\omega_s$ of the vehicle is essentially constant, the analog output voltage of MR sensor 116 generally describes a sinusoid over time as shown in FIG. 3 wherein the zero crossing points 312 of the sinusoid 310 correspond to instances in time when sensitive axis 212 of MR sensor 116 is perpendicular to magnetic field 214. The vertical axis in FIG. 3 is the output voltage ($V_{OUT}$) of MR sensor 116, and the horizontal axis represents time (t).

Figure 4:
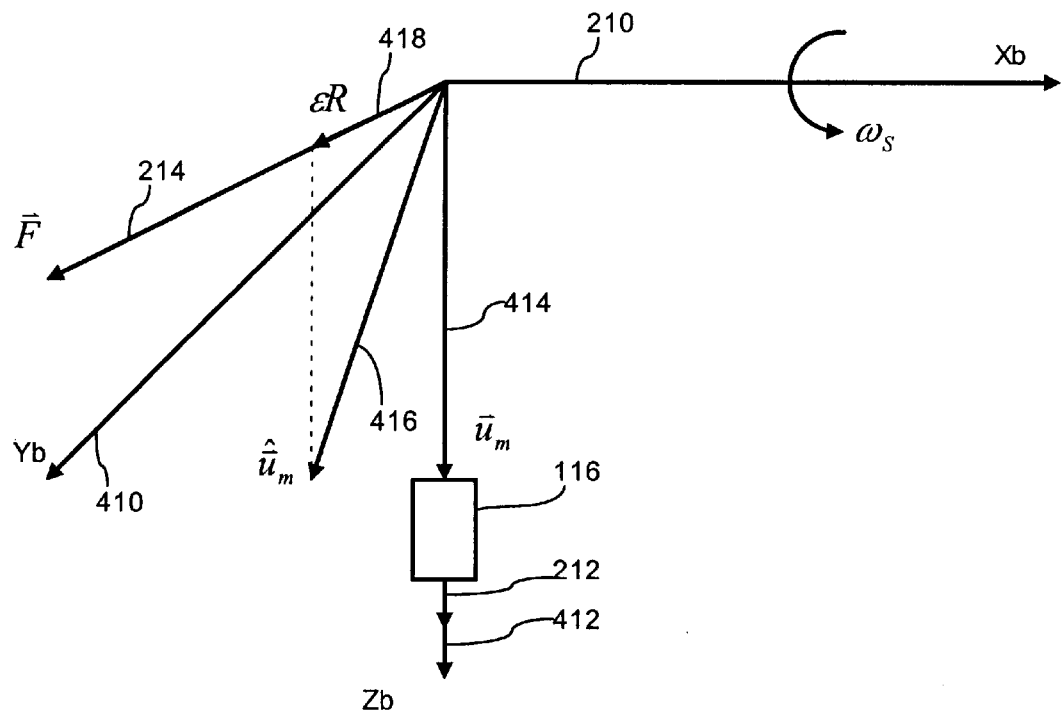
FIG. 4 is a graphical representation of the orientation of a local magnetic field relative to the vehicle body coordinate frame for determining a roll error measurement residual in accordance with the present invention.

Referring now to FIG. 4, a graphical representation of the orientation of a local magnetic field relative to the vehicle body coordinate frame for determining a roll error measurement residual in accordance with the present invention will be discussed. Specifically, FIG. 4 shows the orientation of the local magnetic field, $\vec{F}$, 214, with respect to the vehicle body frame when sensitive axis 212 of MR sensor 116 is perpendicular to magnetic field 214 at a zero crossing point 312 of the output of MR sensor 116. Axes Xb 210, Yb 410 and Zb 412 represent the roll, pitch and yaw axes, respectively of the vehicle body. At the time of a zero crossing 312 in the sinusoidal analog output of MR sensor 116, sensitive axis 212 is perpendicular to magnetic field 214. However, if there is error in the navigation solution's estimate of vehicle attitude, an estimate $\hat{u}_m$ 416 of the unit vector $\vec{u}_m$ 414 along sensitive axis 212 will have a non-zero projection $\epsilon R$ 418 on magnetic field vector 214. Since the magnetic field vector 214 of the earth is known a priori, the component 418 of estimated unit vector 416 along sensitive axis 212 projected onto magnetic field vector 214 at the time of zero crossing 312 can be computed. The result can be processed by navigation processor 114 using an Extended Kalman Filter (EKF) as a measurement residual to obtain improved estimates of the attitude errors, particularly the estimate of the roll attitude error. An extended Kalman filter is a Kalman filter that linearizes about the current mean and covariance. The EKF implementation for processing this measurement is derived below.

At the instant in time of a zero crossing 312, the measurement residual 418 can be specified as the difference between the unit vector 414 along sensitive axis 212 and its estimate 416, the difference being ($\vec{u}_m - \hat{u}_m$), projected on magnetic field vector 214 as shown in FIG. 4. The EFK measurement residual equation is:

$$\epsilon R = H(x - \hat{x}) = H\delta x \qquad (1)$$

where H is the measurement sensitivity matrix, x is the state (truth) vector, and $\hat{x}$ is the state estimate vector. In this case, the attitude errors are defined as:

$$\delta x = \begin{bmatrix} \delta\psi \\ \delta\theta \\ \delta\phi \end{bmatrix}$$

where $\delta\psi$, $\delta\theta$, $\delta\phi$ are the inertial tilt errors which are states. From FIG. 4, the measurement residual 418 is:

$$\epsilon R = [1 \quad 0 \quad 0] C_L^F C_B^L (\vec{u}_m^B - \hat{u}_m^B)$$

where $C_B^L$ is the body frame to local level direction cosine matrix;

$$\vec{u}_m^B = \begin{bmatrix} 0 \\ 0 \\ 1 \end{bmatrix}$$

since
MR sensor 116 is mounted on Zb axis 412, $C_L^F$ is the local level frame to "earth field frame" transformation matrix, and the row vector [1 0 0] indicates that measurement residual 418 is the projection of the estimation error of $\vec{u}_m^B$ projected on earth field vector 214.

Figure 5:
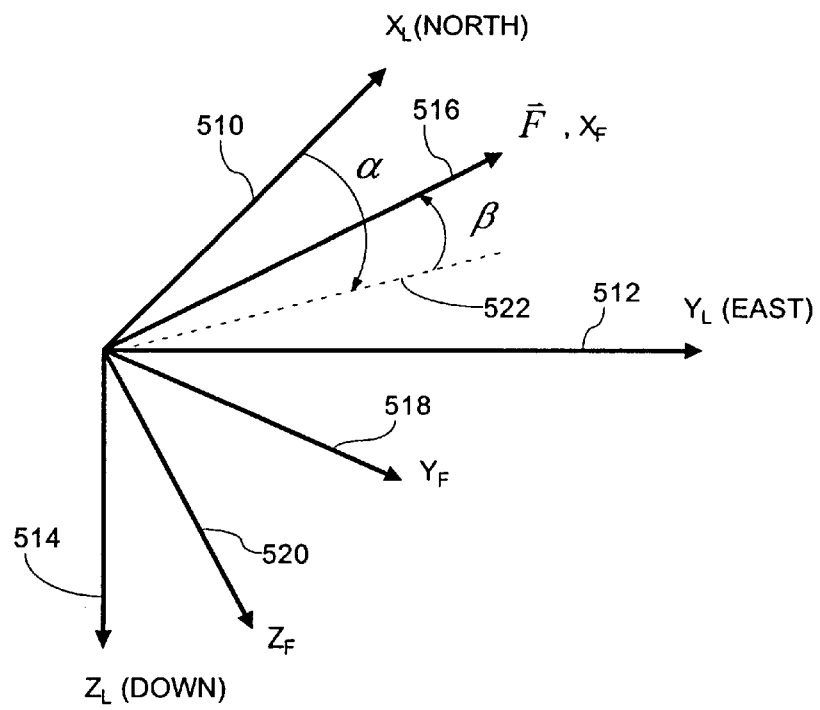
FIG. 5 is a graphical representation of the earth magnetic field reference frame defined by the earth's magnetic field vector relative to the local level reference frame in accordance with the present invention.

The earth field frame is defined by the orientation of earth field vector 214 relative to the local level reference frame as shown in FIG. 5. The declination angle, $\alpha$, is the angle of the projection of earth field vector $\vec{F}$ 214 on local horizontal relative to North. The dip angle, $\beta$, is the angle of earth field vector $\vec{F}$ 214 relative to local horizontal. Thus, $$\varepsilon R = [1 \ 0 \ 0] C_L^F (C_B^L - \hat{C}_B^L) \vec{u}_m^B$$

where $C_B^L$ is the vehicle body to local level frame direction cosine matrix. Using small angle approximations:

$$\varepsilon R = [1 \ 0 \ 0] C_L^F (C_L^B - (I - \psi_B \times) C_B^L) \vec{u}_m^B$$

where $$\psi_B \times = \begin{bmatrix} 0 & -\delta\psi & \delta\theta \\ \delta\psi & 0 & -\delta\phi \\ -\delta\theta & \delta\phi & 0 \end{bmatrix}$$

Thus, $$\varepsilon R = [1 \ 0 \ 0] C_L^F (\psi_B \times) C_B^L \vec{u}_m^B \quad (2)$$

The measurement sensitivity matrix associated with magnetic sensor measurement, H, and the attitude errors, $\delta\psi$, $\delta\theta$, $\delta\phi$, are found by refactoring equation (2) to the form of equation (1). The form of H depends on which body axis MR sensor 116 is mounted. Where MR sensor 116 is mounted on Zb axis 412 as shown in FIG. 4, equation (2) is refactored to the form shown below:

$$\varepsilon R = [-C_{L(1,1)}^F C_{B(2,3)}^L + C_{L(1,2)}^F C_{B(1,3)}^L \quad C_{L(1,1)}^F C_{B(3,3)}^L - C_{L(1,3)}^F C_{B(1,3)}^L \quad -C_{L(1,2)}^F C_{B(3,3)}^L + C_{L(1,3)}^F C_{B(2,3)}^L] \begin{bmatrix} \delta\psi \\ \delta\theta \\ \delta\phi \end{bmatrix} \quad (3)$$

The attitude errors are already states in the navigation EFK, and the H components in equation (3) are inserted into the overall H matrix of the EFK to complete the design.

Figure 6:
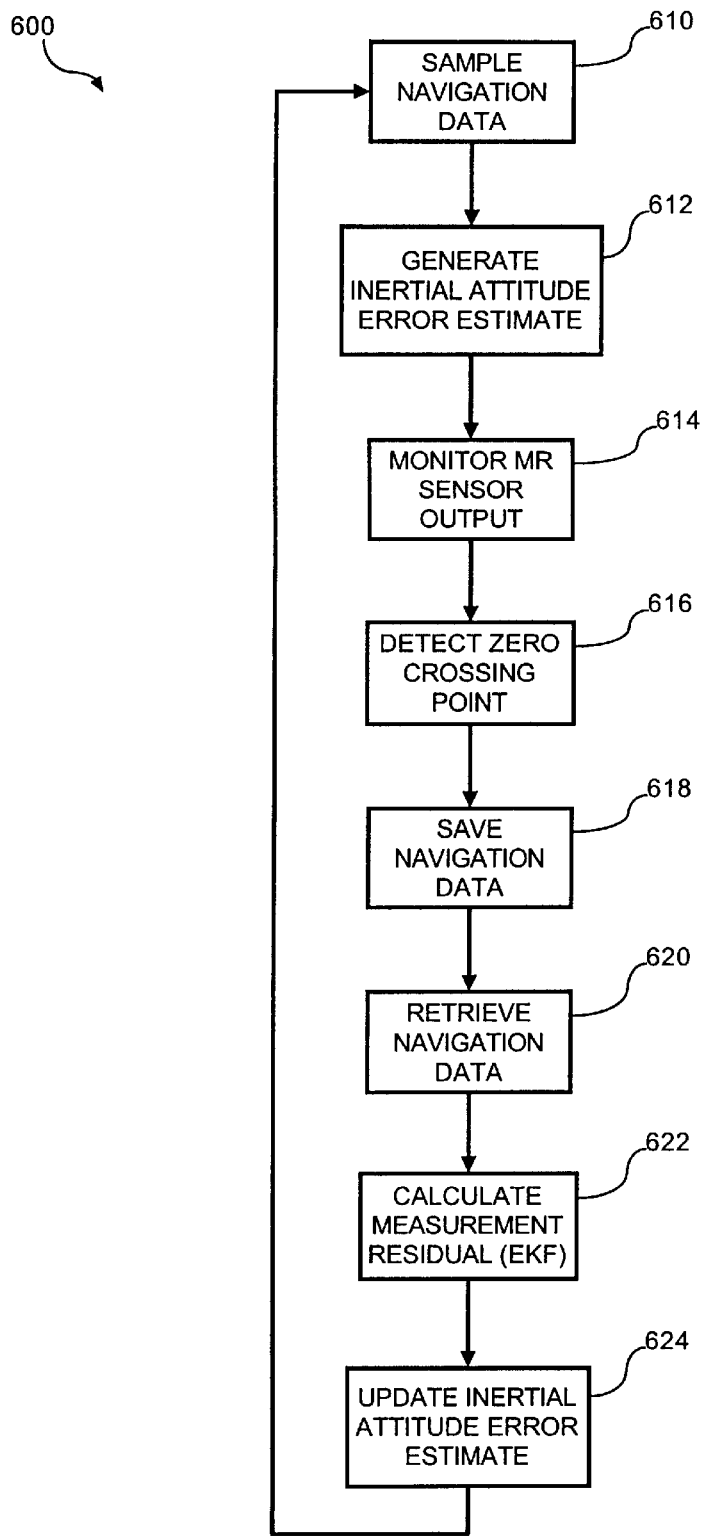
FIG. 6 is a flow diagram of a method for compensating the roll attitude error in the navigation solution for a rolling vehicle such as a missile in accordance with the present invention.

Referring now to FIG. 6, a flow diagram of a method for compensating the roll attitude error in a rolling vehicle in accordance with the present invention will be discussed. The method 600 may be implemented as a program of software instructions executed by navigation processor 114 and storable on a computer readable storage medium (RAM, ROM, floppy disk, compact disk-read-only memory (CD-ROM), etc.). Method 600 may be executed during navigation of a vehicle (e.g., missile, rocket, etc.) that is imparted with a roll or spin during motion or flight. During motion, navigation data is sampled at step 610 by navigation processor 114 from MEMS/IMU 110 and GPS receiver and processor 112 to provide a navigation solution 118. From the navigation data, navigation processor 114 generates an inertial attitude error estimate at step 614. Simultaneously, navigation processor 114 monitors the output of MR sensor 116 at step 614 as the vehicle passes through a local magnetic field (i.e. the earth's magnetic field). As the vehicle spins, navigation data with the current time, including the output from MR sensor 116, is saved so that when a zero crossing 312 in the output of MR sensor 116 is detected, the data associated with that time can be retrieved at step 620 and post-processed by an extended Kalman filter (EFK) implemented by navigation processor 114 to calculate a measurement residual at step 622. The measurement residual is post-processed by navigation processor 114 since the EKF implementation runs at a rate that typically does not allow interactive real-time processing of the residual simultaneously with the occurrence of each residual crossing 312. The navigation data associated with zero crossing 312 is used to compute the estimated component of sensitive axis 212 of MR sensor 116 projected on the a priori known local magnetic field vector (i.e. the earth's magnetic field) 214, the estimated component being measurement residual 418. The navigation data associated with zero crossing 312 is used by navigation processor 114 in the EKF to post-process the measurement residual whereby the inertial attitude error estimates may be updated at step 624 by compensation with the measurement residual.

Figure 7:
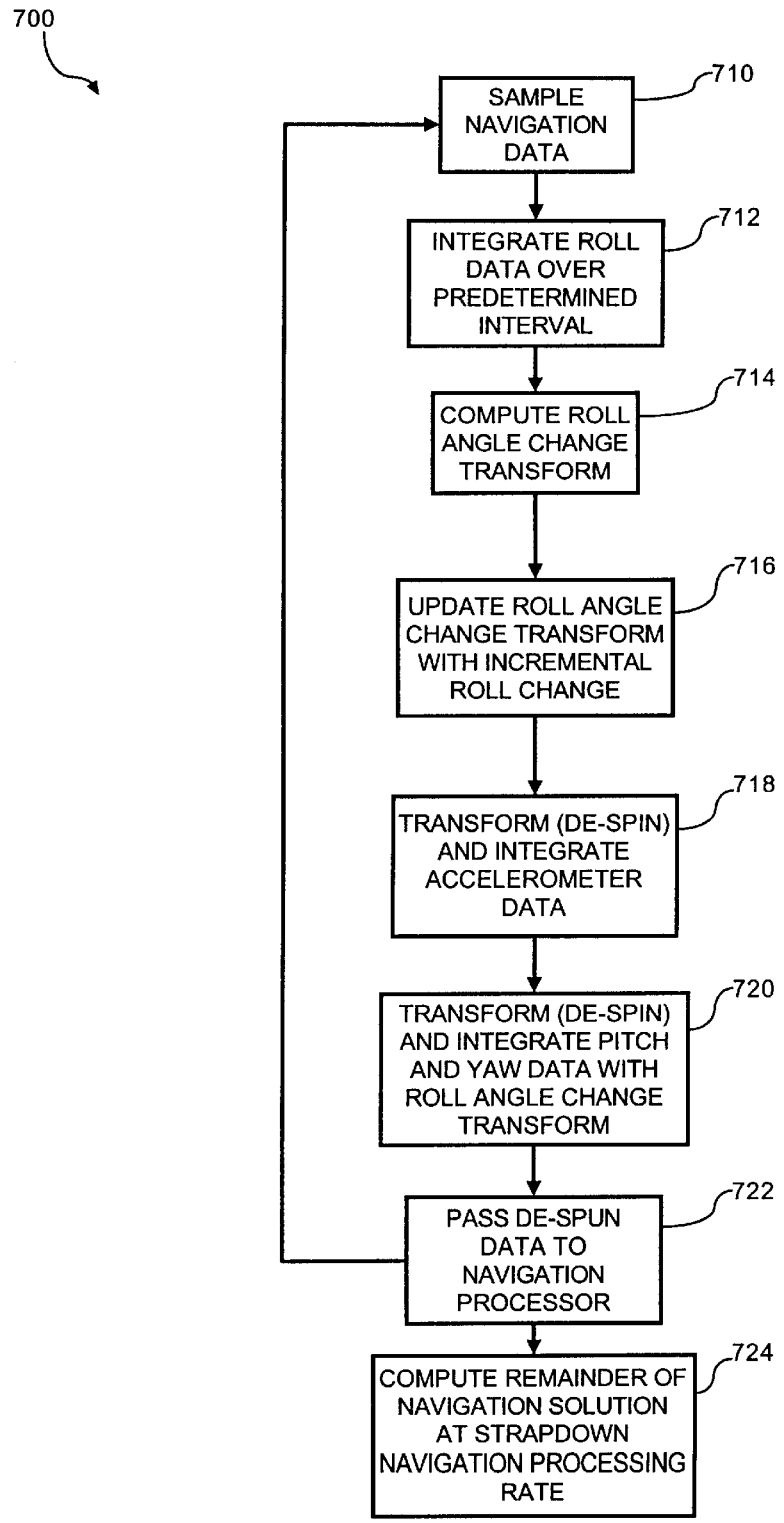
FIG. 7 is a flow diagram of a method for computationally de-spinning strapdown inertial sensor measurements for navigation on a rolling vehicle in accordance with the present invention.

Referring now to FIG. 7, a method for computationally de-spinning strapdown inertial sensor measurements for navigation on a rolling vehicle in accordance with the present invention will be discussed. The de-spin method 700 is executed by navigation processor 114 (e.g., in a microprocessor or digital signal processor (DSP)) following the sampling of the outputs of MEMS/IMU 110 and GPS receiver and processor 112 at step 710 provide accelerometer, roll, pitch and yaw data. De-spin method 700 may be implemented as a program of software instructions executed by navigation processor 114 and storable on a computer readable storage medium (RAM, ROM, floppy disk, compact disk-read- only memory (CD-ROM), etc.). Further, the de-spin method may be utilized alone or in combination with the method for calculating a measurement residual as discussed with respect to FIG. 6 by sampling the output of MR sensor 116 by correction of the roll error prior to de-spin processing. The de-spin processing is performed by navigation processor 114 in conjunction with conventional strapdown algorithms at a typical strapdown processing rate (e.g., 100 Hz). The time interval (e.g., 0.01 seconds) over which de-spin processing occurs between the beginning of execution periods of navigation processor 114 is defined as the de-spin processing interval. In navigation processor 114, at the beginning of the de-spin processing interval, the roll change transform, $C^{\Delta\Phi_0}$, is initialized to the identity matrix, $I_{[3\times 3]}$. Then the sampled x-(roll) gyro outputs of MEMS/IMU 110 (e.g., 20 kHz samples) are integrated at the predetermined interval at step 712 to obtain the roll angle change, $\Delta\phi_I$:

$$\Delta \phi_l = \Delta T_S \left( \sum_{i=1}^{n} (\dot{\phi}_{l*n+i} + \dot{\phi}_{corr}) \right)$$

where n is a constant set such that $\Delta\phi_l$ never exceeds a small angle change (e.g., 0.05 radians), l is initialized to zero at the beginning of the de-spin processing interval, $\Delta T_S$ is the sample period of the sampled outputs (e.g., from A/D converters) that outputs $\dot{\phi}_{l*n+i}$, and $\dot{\phi}_{corr}$ are roll gyro (MEMS/IMU 110) measurement corrections from navigation processor 114. Following the computation of $\Delta\phi_l$, the roll change transform is computed at step 714:

$$C^{\Delta\phi} = \begin{bmatrix} 1 & 0 & 0 \\ 1 & \cos\Delta\phi_l & \sin\Delta\phi_l \\ 0 & -\sin\Delta\phi_l & \cos\Delta\phi_l \end{bmatrix}$$

Then the cumulative angular rotation transform from the beginning of the roll change interval is updated at step 716:

$$C^{\Delta\phi_l} = C^{\Delta\phi} C^{\Delta\phi_{l-1}}$$

The sampled accelerometer outputs are then "de-spun" and integrated at step 718:

$$d\vec{V}_m^{\Delta\phi} = \Delta T_j \sum_{i=1}^{l+j} [C^{\Delta\phi_l}]^T (\vec{a}_{i*n} + \vec{a}_{corr})$$

where $\vec{a}_{corr}$ is the estimated accelerometer error correction vector from the navigation function, and j is selected such that the integral is over a short interval (e.g., 1 millisecond).

The sampled gyro outputs (MEMS/IMU 112) are also de-spun and integrated at step 720:

$$d\vec{\theta}_m^{\Delta\phi} = \Delta T_j \sum_{i=1}^{l+j} [C^{\Delta\phi_l}]^T (\vec{\theta}_{i*n} + \vec{\theta}_{corr})$$

where $\vec{\theta}_{corr}$ is the estimated gyro error correction vector from the navigation function, and j is a constant selected such that the integral is over a short interval (e.g., 1 millisecond). Only the y-(pitch) and z-(yaw) gyro measurements need be included in the vector, $\vec{\theta}_{i*n}$, since the are being de-spun, and the element associated with the x-gyro is set to zero.

The transformation and integration of the de-spun inertial sensor measurements at a high rate minimizes the effects of sculling and coning that are caused by changes in acceleration and angular rates between computations. At the end of the de-spin processing interval, the de-spun accelerometer and y- and z-gyro measurements are passed at step 722 to navigation processor 114 for navigation processing, and the next de-spin processing interval begins. Subsequent to executing the de-spin process, strapdown navigation processing in navigation processor 114 may be performed at step 724 under the assumption of a non-rolled vehicle body frame.

It is believed that the method and apparatus for utilization of a magnetic sensor to compensate a MEMS-IMU/GPS and de-spin strapdown on rolling missiles or the like of the present invention and many of the attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for compensating the roll attitude error in the navigation solution for a rolling vehicle, comprising:
   sampling navigation data for a rolling vehicle;
   generating an inertial attitude error estimate from the sampled navigation data;
   monitoring an output of a magnetic field sensor, the magnetic field sensor having a sensitive axis being disposed perpendicular to an axis of rotation of the rolling vehicle, the output of the magnetic field sensor being generated as the rolling vehicle passes through a local magnetic field;
   detecting a zero crossing point in the output of the magnetic field sensor;
   calculating a measurement residual based on the navigation data at a time corresponding to the zero crossing point; and
   updating the inertial attitude error estimate with the calculated measurement residual whereby the navigation solution remains stable.

2. A method as claimed in claim 1, further comprising the steps of saving navigation data to an information storage medium for subsequent retrieval and processing and then retrieving navigation data from the information storage medium for processing.

3. A method as claimed in claim 1, said sampling step including the step of sampling outputs of a MEMS/IMU and GPS receiver processor.

4. A method as claimed in claim 1, the zero crossing point corresponding to an instance where the sensitive axis of the magnetic field sensor is perpendicular to the local magnetic field.

5. A method as claimed in claim 1, the magnetic field sensor being a magnetoresistance ratio sensor.

6. A method as claimed in claim 1, the local magnetic field being the magnetic field of the earth.

7. A method as claimed in claim 1, said step of calculating a measurement residual being executed with an extended Kalman filter.

8. A method for computationally de-spinning strapdown inertial sensor measurements for navigation on a rolling vehicle, comprising:
   sampling navigation data of a rolling vehicle, the sampled data including accelerometer data, roll data, pitch data and yaw data for the rolling vehicle;
   integrating roll data of the sampled data over a predetermined interval;
   computing a roll angle change transform;
   updating the roll angle change transform with incremental roll change data;
   transforming and integrating accelerometer data with the roll angle change transform whereby the accelerometer data is de-spun;
   transforming and integrating pitch and yaw data with the roll angle change transform whereby the pitch and yaw data are de-spun; and
   computing a navigation solution strapdown at a predetermined navigation processing rate.

9. A method as claimed in claim 8, the predetermined interval of said step of integrating roll data being selected so that incremental changes in roll data do not exceed a smaller angle.

10. A method as claimed in claim 8, the predetermined interval of said step for integrating roll data being selected so that incremental changes in roll data do not exceed 0.05 radians.

11. A method as claimed in claim 8, said step of transforming and integrating pitch and yaw data including the step of integrating at a rate sufficient to minimize sculling and coning effects.

12. A method as claimed in claim 8, said step of transforming and integrating pitch and yaw data including integrating over a short enough time interval to ensure that small angle approximations of transforming pitch and yaw data are not exceeded.

13. A method as claimed in claim 8, said step of transforming and integrating accelerometer data including the step of integrating at a rate sufficient to minimize sculling and coning effects.

14. A method as claimed in claim 8, said step of transforming and integrating accelerometer data including integrating over a short enough time interval to ensure that small angle approximations of transforming accelerator data are not exceeded.

15. A method as claimed in claim 8, the predetermined navigation processing rate being a typical strapdown navigation processing rate.

16. A method as claimed in claim 8, the predetermined navigation processing rate being sufficient to minimize non-linearities induced by pitch and yaw rates.

17. A method for computing a navigation solution in a rolling vehicle, comprising:

sampling navigation data of a rolling vehicle, the sampled data including accelerometer data, roll data, pitch data and yaw data for the rolling vehicle;

calculating a measurement residual based upon the output of a magnetic sensor that detects the orientation of the rolling vehicle with respect to a local magnetic field;

updating an inertial attitude error estimate with the calculated measurement residual whereby the navigation solution remains stable;

computationally de-spinning accelerometer and pitch and yaw data; and computing a navigation solution strapdown at a predetermined navigation processing rate with the de-spun accelerometer, pitch and yaw data.

18. A method as claimed in claim 17, the magnetic sensor being a magnetoresistance ratio sensor.

19. A method as claimed in claim 17, said step of computationally de- spinning accelerometer and pitch and yaw data including the step of integrating a rate sufficient to minimize sculling and coning effects.

20. A method as claimed in claim 17, the predetermined navigation processing rate being a typical strapdown navigation processing rate.

* * * * *